US009685019B2

(12) United States Patent
Mengel et al.

(10) Patent No.: US 9,685,019 B2
(45) Date of Patent: Jun. 20, 2017

(54) DEVICE FOR EXAMINING A VALUE DOCUMENT AND METHOD FOR EXAMINING A VALUE DOCUMENT

(71) Applicant: GIESECKE & DEVRIENT GMBH, Munich (DE)

(72) Inventors: Christoph Mengel, Holzkirchen (DE); Alexander Bornschlegl, Munich (DE); Peter Schiffmann, Munich (DE); Jurgen Schutzmann, Pfaffenhofen (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 11 days.

(21) Appl. No.: 14/648,175

(22) PCT Filed: Dec. 10, 2013

(86) PCT No.: PCT/EP2013/003732
§ 371 (c)(1),
(2) Date: May 28, 2015

(87) PCT Pub. No.: WO2014/090397
PCT Pub. Date: Jun. 19, 2014

(65) Prior Publication Data
US 2015/0302676 A1 Oct. 22, 2015

(30) Foreign Application Priority Data
Dec. 10, 2012 (DE) ........................ 10 2012 024 175

(51) Int. Cl.
*G06K 9/00* (2006.01)
*G07D 7/04* (2016.01)
*G07D 7/12* (2016.01)

(52) U.S. Cl.
CPC ................ *G07D 7/04* (2013.01); *G07D 7/12* (2013.01); *G07D 7/124* (2013.01)

(58) Field of Classification Search
CPC ................................ G07D 7/04; G07D 7/124
See application file for complete search history.

(56) References Cited

U.S. PATENT DOCUMENTS 6,363,164 B1 * 3/2002 Jones .................... G06K 9/033 194/206
2002/0084321 A1 * 7/2002 Martens ............ G06K 7/10861 235/379

(Continued)

FOREIGN PATENT DOCUMENTS

DE 2909731 A1 9/1979
DE 102009023981 A1 12/2010

(Continued)

OTHER PUBLICATIONS

International Search Report from corresponding PCT Application No. PCT/EP2013/003732, Feb. 28, 2014.

(Continued)

*Primary Examiner* — Oneal R Mistry
(74) *Attorney, Agent, or Firm* — Workman Nydegger

(57) ABSTRACT

A method or apparatus for examining a security element of a value document involves at least one optical property of the security element influenceable by a magnetic field. The value document is transported through a magnetic field which is inhomogeneous transversely to the transport direction and/or is changed time-dependently. An image of at least one portion of the value document having the security element is captured and image data describing the image are formed. The optical properties of the security element are influenced by the magnetic field, and the image data is checked whether they have a location dependence transverse to the transport direction corresponding to the location (Continued)

dependence of the magnetic field and/or have a location dependence in the transport direction corresponding to the time dependence of the magnetic field.

16 Claims, 6 Drawing Sheets

(56) References Cited

U.S. PATENT DOCUMENTS

| | | | | |
|---|---|---|---|---|
| 2005/0181160 | A1 | 8/2005 | Schneider | |
| 2009/0039644 | A1 | 2/2009 | Lawandy | |
| 2009/0066076 | A1 | 3/2009 | Schneider | |
| 2010/0059591 | A1* | 3/2010 | Kayani | G07D 7/04 235/449 |
| 2011/0233277 | A1* | 9/2011 | Schutzmann | G07D 7/04 235/450 |
| 2012/0170829 | A1* | 7/2012 | Jackson | G06K 9/72 382/140 |

FOREIGN PATENT DOCUMENTS

| | | | |
|---|---|---|---|
| WO | 03/089250 | A2 | 10/2003 |
| WO | 2009/074284 | A2 | 6/2009 |

OTHER PUBLICATIONS

International Preliminary Report on Patentability from corresponding PCT Application No. PCT/EP2013/003732, Jun. 16, 2015.

* cited by examiner

Replacement Sheet
4/6

DEVICE FOR EXAMINING A VALUE DOCUMENT AND METHOD FOR EXAMINING A VALUE DOCUMENT

BACKGROUND

The present invention relates to an apparatus and a method for examining a value document, in particular a value document having a security element whose optical properties are influenceable by a magnetic field.

In this context, value documents are understood to mean sheet-shaped objects, which represent for example a monetary value or an authorization and thus shall not be manufacturable at will by unauthorized persons. They hence have features that are not simple to manufacture, in particular to copy, whose presence is an indication of authenticity, i.e. of manufacture by an authorized body. Important examples of such value documents are coupons, vouchers, checks and in particular bank notes. Value documents can have certain value document types. In particular, value documents in the form of banks notes can have a value document type which can be given by the currency, the denomination, or the value and, where applicable, the issue of the bank note.

Such value documents can have security elements which can be easily checked by a person without complicated examination devices. An example of such security elements are security elements whose optical properties are influenceable by a magnetic field. If a person moves a permanent magnet over the security element, he can perceive a respective change of the optical properties.

To enable a check of large amounts of value documents for their quality, state and/or authenticity, apparatuses for accepting or processing value documents are employed, in which the accepted or processed value documents are checked by machine and further treated according to the result of the machine check.

SUMMARY

The present invention is based on the object of providing a method for examining value documents having a security element whose optical properties are influenceable by a magnetic field, and to create an apparatus for examining such value documents.

The object is achieved by a method for examining a security element of a value document, wherein at least one optical property of the security element is influenceable by a magnetic field, in which the value document is transported through a magnetic field which is inhomogeneous transversely to the transport direction and/or is changed time-dependently, an image of at least one portion of the value document having the security element is captured and image data describing the image are formed, wherein the optical properties of the security element are being influenced by the magnetic field, and it is checked whether the image data, which describe an image region showing the security element, have a location dependence transverse to the transport direction corresponding to the location dependence of the magnetic field and/or have a location dependence in the transport direction corresponding to the time dependence of the magnetic field.

The object is further achieved by an apparatus for examining a security element of a value document, wherein at least one optical property of the security element is influenceable by a magnetic field, with an image capturing device having a capture region, which is configured to capture a locally resolved image of at least one portion of the value document having the security element, while this is transported through the capture region in a specified transport plane in a specified transport direction, and to generate image data describing the image, a magnetic field-generating device for generating a magnetic field which is inhomogeneous transversely to the transport direction and/or time variable, regarded in the transport direction before and/or in the capture region, so that the security element has optical properties influenced by the magnetic field when it passes the capture region, and an evaluation device for evaluating the image data, which is configured to check whether the image data, which describe an image region showing the security element, have a location dependence transverse to the transport direction corresponding to the location dependence of the magnetic field and/or have a location dependence in the transport direction corresponding to the time dependence of the magnetic field.

Therefore, two alternatives are suggested, which can also be combined.

According to the first alternative, the object is therefore achieved by a method for examining a security element of a value document, wherein at least one optical property of the security element is influenceable by a magnetic field, in which the value document is transported through a magnetic field which is inhomogeneous transversely to the transport direction, an image of at least one portion of the value document having the security element is captured and image data describing the image are formed, wherein the optical properties of the security element are being influenced by the magnetic field, and it is checked whether the image data, which describe an image region showing the security element, have a location dependence transverse to the transport direction corresponding to the location dependence of the magnetic field.

The object is therefore also achieved according to the first alternative by an apparatus for examining a security element of a value document, wherein at least one optical property of the security element is influenceable by a magnetic field, with an image capturing device having a capture region, which is configured to capture a locally resolved image of at least one portion of the value document having the security element, while this is transported through the capture region in a specified transport plane in a specified transport direction, and to generate image data describing the image, a magnetic field-generating device for generating a magnetic field which is inhomogeneous transversely to the transport direction, regarded in the transport direction before and/or in the capture region, so that the security element has optical properties influenced by the magnetic field when it passes the capture region, and an evaluation device for evaluating the image data, which is configured to check whether the image data, which describe an image region showing the security element, have a location dependence transverse to the transport direction corresponding to the location dependence of the magnetic field.

The object is achieved according to a second alternative by a method for examining a security element of a value document, wherein at least one optical property of the security element is influenceable by a magnetic field, in which the value document is transported through a magnetic field which during the transport of the value document through the magnetic field is changed in time, an image of at least one portion of the value document having the security element is captured and image data describing the image are formed, wherein the optical properties of the security element are being influenced by the magnetic field, and it is checked whether the image data, which describe an image region showing the security element, have a location dependence in the transport direction corresponding to the time dependence of the magnetic field.

The object is further achieved, according to the second alternative, by an apparatus for examining a security element of a value document, wherein at least one optical property of the security element is influenceable by a magnetic field, with an image capturing device having a capture region, which is configured to capture a locally resolved image of at least one portion of the value document having the security element, while this is transported through the capture region in a specified transport plane in a specified transport direction, and to generate image data describing the image, a magnetic field-generating device for generating a magnetic field which varies in time during the transport of the security element, regarded in the transport direction before and/or in the capture region, so that the security element has optical properties influenced by the magnetic field when it passes the capture region, and an evaluation device for evaluating the image data, which is configured to check whether the image data, which describe an image region showing the security element, have a location dependence in the transport direction corresponding to the time dependence of the magnetic field.

The invention relates to the examination of value documents having a security element which has at least one optical property which is influenceable by a magnetic field. The value documents can in particular have specified value document types which are preferably known before the method is carried out. The security element is located at a specified place, where applicable specified for a value document type, of a value document. The security element is more precisely an areal security element whose optical properties are locally influenceable by a magnetic field. Depending on the kind of security element, the influencing by a magnetic field can substantially be effected instantaneous or it can be necessary that a magnetic field must act over a somewhat longer time period. In particular in the latter case, the optical property influenced by the magnetic field can preferably be maintained for a certain time span after leaving the magnetic field.

A suitable inhomogeneous magnetic field can then generate a respective pattern of the optical property. Optical properties are in general understood to mean properties which appear upon the interaction with optical radiation, i.e. radiation in the UV wavelength range or IR wavelength range or in the visible wavelength range. The properties need to appear only in a wavelength range specified by the security element. In particular remission properties or transmission properties come into consideration as optical properties.

The security element preferably has a layer with effect pigments reversibly alignable by a magnetic field, which can be configured platelet-shaped or rod-shaped. This layer can be configured in particular on a layer which has other optical properties, for example another color, than the effect pigments, for example in the case of platelet-shaped effect pigments on the surface of the platelet or in the case of rod-shaped effect pigments on the circumferential surface of the pigment or rod. But it is also possible that the layer is arranged on a transparent or translucent layer which covers a hole in a value document and is thus a part of a window of the value document. Effect pigments within the framework of the present invention are understood to mean pigments which have an optical property which depends on the angle between a preferential direction of a pigment particle and a viewing. The optical property can be for example a change of the visible surface of the pigment particle with the angle and/or a change of the remission capability or transmission capability, for example a color change. Further, the effect pigments have magnetic properties which enable an alignment by means of a magnetic field. Preferably, the effect pigments can be enclosed in microcapsules. Examples of such security elements can be found in the WO 2009/074284 A2 of the applicant.

Depending on the configuration of the security element and the environmental conditions, a magnetic field must be able to act on the security element over a certain time period, so that an alignment of the effect pigments is obtained. Further, the effect pigments may lose an alignment produced by a magnetic field, depending on the configuration of the security element and the environmental conditions, within a very short period, for example less than one second or only after minutes or hours.

For the machine checking, the security element is transported in a transport plane in a specified transport direction along a specified transport path at a specified transport speed. For this purpose, a transport device can be provided by means of which the value documents can be transported. When within the framework of the present invention a transport plane is spoken of in connection with a device or the capture region, the transport plane is the plane in which the value document is transported at the device or the capture region.

According to the first alternative, upon the transport the value document is transported through a magnetic field which is inhomogeneous transversely to the transport direction; an inhomogeneous magnetic field is understood here to mean a magnetic field which has a location dependence, i.e. whose direction and/or size location-dependently vary in a specified manner, it being possible that there are portions in which the variation is very small or completely disappears. For generating the magnetic field, the magnetic field-generating device is configured accordingly and can be configured in particular such that the magnetic field has the properties described in the following. The magnetic field transverse to the transport direction needs to extend only over a portion in which security elements of value documents can be expected. Preferably, however, it extends over the entire width of the transport path. The inhomogeneous magnetic field, which preferably does not change during the transport of the value document through the magnetic field, has a field course, so that this leads to influencing the optical property of the security element, which optical property is detectable in the capture region. Because of the transport through the magnetic field the optical properties of the security element obtain in the direction transverse to the transport direction a location dependence which corresponds to the location dependence of the magnetic field. Parallel to the transport direction, however, there result similar or equal optical properties, however, because the respective regions of the security element are exposed to the same magnetic field. Altogether there can thus result a pattern in the form of stripes, whose stripes extend in parallel to the transport direction. To enable the generation of such a pattern, the magnetic field is being or is preferably so generated that the security element has a recognizable location dependence of the optical property influenceable by a magnetic field, when it is located in the magnetic field or leaves the same. The magnetic field or the magnetic field-generating device generating this is to be provided accordingly.

The course of the magnetic field in many embodiments can be stated more precisely by the differentiation of three zones. Regarded in the transport direction, between two end zones there is located a main magnetization zone. The end zones are the zones in which the magnetic field generated by the magnetic field-generating device cannot or can no longer substantially influence the optical property of the security element at the employed transport speed. The main magnetization zone is the region between the end zones, in which the magnetic field substantially influences the optical property. The magnetic field can then be inhomogeneous transversely to the transport direction preferably in the main magnetization zone. In directions parallel to the transport direction, however, the directions of the magnetic field are preferably substantially constant along straight lines extending parallel to the transport direction.

There is then captured a locally resolved image of at least one portion of the value document having the security element. This is understood to mean, that there is captured an image of at least that region or those regions in which security elements of authentic value documents of specified value document types could be located depending on the orientation of the respective value document. Preferably, an image of the total value document is captured.

The locally resolved image here reproduces at least the magnetically influenceable optical properties of the security element. For capturing the image, there is provided the image capturing device which is configured accordingly and is in particular configured for capturing the magnetically influenceable optical properties of the security element. Preferably, the image is a digital image. At the apparatus image data describing the image are generated by means of the image capturing device. The digital image may comprise pixels whose properties describe the image data. The locations corresponding to the pixels are here fixed relative to the magnetic field or the magnetic field-generating device.

Now it is checked whether the image data which describe a region showing the security element have a location dependence in a direction transverse to the transport direction, which corresponds to the location dependence of the magnetic field. A region showing the security element is understood here to mean at least one region in which the security element should be located in the case of an authentic value document of a specified value document type. In particular in the case that the magnetic field course has a main magnetization zone, the location dependence of the magnetic field can be given by the location dependence of the magnetic field transverse to the transport direction.

In the case of an authentic value document the security element will have the pattern generated by the magnetic field, which pattern, although it is found only on the security element, has a structure which is fixed by the magnetic field. Even in the case of a rotation of the value document or variations in the orientation of the value document transverse to the transport direction, with an authentic security element the location dependence of the optical property and thus of the image data will correspond to the location dependence of the magnetic field, even when the alignment and/or orientation of the value document varies relative to the transport device and to the examination apparatus. In the case of a view forgery, in which the security element is replaced by a print, the image either shows no pattern or a pattern which completely conforms to the orientation and alignment of the value document but not to the magnetic field, which can be recognized upon the check.

After the end of the check, a signal can be formed and emitted, which indicates the result of the check. If it is ascertained upon the check that the location dependencies mutually correspond, a signal can be formed and emitted which indicates that the security element was recognized or recognized as authentic, otherwise a signal can be formed which represents or indicates a forgery suspicion.

In the apparatus, for carrying out the check there is provided the evaluation device which is configured accordingly.

The second alternative differs from the first alternative only in the kind of magnetic field and the evaluation. The explanations regarding the unchanged components also apply accordingly here.

In the second alternative a magnetic field varying in time is employed. Regarding the extent of the magnetic field there apply the above statements. Because of the transport of the value document and thus of the security element in the transport direction there hence results a location dependence of the optical property and thus of the image of the security element or of the respective image data in the transport direction. Hence, the time dependence of the magnetic field is to be selected such that thereby results a corresponding location dependence of the optical property, which is influenceable by the magnetic field, in the transport direction.

Hence, it is checked whether the location dependence of the image data in the transport direction corresponds to the time dependence of the magnetic field. Also with this alternative, a view forgery is in general very easy to recognize, because the location dependence of the optical properties of the security element, which are generatable by a magnetic field, only depends on the time dependence and kind of the magnetic field and the transport properties, in particular the transport speed, and the synchronization of value document transport and time variation of the magnetic field.

In case of a combination of the alternatives, at the apparatus of the second alternative in particular the magnetic field-generating device can be configured such that the magnetic field varying in time is a magnetic field that is at least inhomogeneous transversely to the transport direction, and at which the evaluation device is further configured to additionally check whether the image data which describe an image region showing the security element have a location dependence corresponding to the location dependence of the inhomogeneous magnetic field transverse to the transport direction. In the method, the magnetic field varying in time can be a magnetic field inhomogeneous transversely to the transport direction, and there can be additionally checked whether the image data, which describe an image region showing the security element, have a location dependence transverse to the transport direction corresponding to the location dependence of the magnetic field.

A substantial advantage of the invention is the fact that optical sensors present in a value document-accepting or -processing apparatus for other purposes, for example for checking the printed image, can be used as an image capturing device, so that only the magnetic field-generating device is to be provided and the configuration of an evaluation device already present for the optical sensors is to be adjusted, which often can be effected solely by reprogramming. In particular only one image needs to be captured on a specified side of the value document for the recognition of the security element. Hence, it is preferred that the examination apparatus for the examination of one side of the value document has only one image capturing device or that in the method for the examination of one side of the value document only one image capturing device is employed.

Another advantage of the invention is the fact that in spite of the simple construction view forgeries hardly seem possible, because for this purpose the construction or the function of the magnetic field-generating device would have to be known and, moreover, the alignment and orientation of the printed pattern in the region of the security element is determined solely by the orientation and alignment of the value document relative to the image capturing device, whereas in the case of authentic security elements the pattern generated by the magnetic field, i.e. the location dependence of the image data, is substantially determined by the magnetic field-generating device and the transport direction. In particular, in practice there occur almost always slight variations in orientation and alignment of a value document in the transport path, which in case of a view forgery would lead to a deviation of the location dependencies.

For readily recognizing a pattern in the optical property or the optical properties of the security element, which pattern was caused by the magnetic field, the magnetic field should have a course which leads to an as distinctive a location dependence of the image data for the security element as possible or to an as distinctive a pattern as possible. A particularly suitable course may depend in particular on the properties of the security element.

In general and preferably in the case of security elements having a layer which has effect pigments, particularly preferred platelet-shaped or rod-shaped, which are reversibly alignable by a magnetic field, in the method, the direction of the magnetic field in the transport plane in at least some first portions may enclose with the transport plane preferably an angle of less than 40°, preferably less than 20°, and in other second portions with the transport plane an angle between 50° and 90°, preferably 75° and 90°, wherein the first and second portions are alternately arranged preferably transverse to the transport direction. In the apparatus, for this purpose preferably the magnetic field-generating device can be configured such that in the transport plane the direction of the magnetic field in at least some first portions encloses with the transport plane an angle of less than 40°, preferably less than 20°, and in other second portions encloses with the transport plane an angle between 50° and 90°, preferably 75° and 90°, wherein the first and second portions are preferably alternately arranged transverse to the transport direction. The optical properties of the security element can then strongly differ in the respective portions.

Preferably, the transitions of the optical property influenced by the magnetic field in between the regions of the security element which correspond to the first and second portions are as sharp as possible, so that checking the correspondence of the location dependencies of the magnetic field and of the image data can be effected simply and securely.

For this purpose the magnetic device can have pole surfaces from which field lines of the magnetic field exit or into which field lines of the magnetic field enter and which have surface normals which have an angle with the transport plane in the region between 70° and 90°, preferably 85° and 90°, particularly preferred an angle of 90°. The pole surfaces can in particular be planar. A pole surface is understood here to mean a surface of a component conducting the magnetic flux or of a magnetic dipole, through which at least 50%, preferably at least 80% of the magnetic flux exits or enters. In this manner it is possible to generate very strong contrasts.

Depending on the kind of security element it may be advantageous to let a magnetic field act on the security element over an as long a period as possible, so that the respective change of the optical property is achieved. This can be the case, for example, for microencapsulated effect pigments alignable by a magnetic field. In the method, the magnetic field is then preferably generated such that the projection of the magnetic field vector on the transport plane encloses with the transport direction an angle in the range between 70° and 90°, particularly preferred 85 to 90°, and particularly preferably is orthogonal to the transport direction. In the examination apparatus, for this purpose the magnetic field-generating device can be configured to generate the magnetic field such that a projection of the magnetic field vector on the transport plane encloses with the transport direction an angle in the region between 70° and 90°, particularly preferred 85 to 90° and particularly preferred is orthogonal to the transport direction. For this purpose, the magnetic field-generating device can have poles alternately arranged transversely to the transport direction.

The magnetic field can be generated in various ways. It is thus possible that in the method the magnetic field is generated using at least one permanent magnet or a permanent magnet foil. In the apparatus, the magnetic field-generating device can accordingly have at least one permanent magnet or a permanent magnet foil. This embodiment is characterized by the advantage of a very simple construction and the possibility of generating very strong magnetic fields.

In order to further limit the possibility of a view forgery of the security element, in the method, before the transporting of the value document, a retainer movable back and forth between a specified number of positions, in which retainer, permanent magnets are arranged such that in each of the positions at least one of the permanent magnets generates a different magnetic field inhomogeneous transversely to the transport direction, can be moved from an existing position into a new position. In the apparatus, for this purpose, the magnetic field-generating device can have a retainer movable back and forth between a specified number of positions relative to the optical detection device, in which retainer, permanent magnets are arranged such that in each of the positions at least one of the permanent magnets generates a different magnetic field inhomogeneous transversely to the transport direction. The evaluation device is then configured such that upon checking it employs the location dependence of the adjusted magnetic field.

Alternatively or additionally to the use of permanent magnets, in the method, the magnetic field can be generated using a coil arrangement having at least one coil for the generation of a magnetic field. In the apparatus, the magnetic field-generating device can then have a coil arrangement with at least one coil for the generation of a magnetic field. Preferably, the magnetic field-generating device further has a driving device which supplies the coil arrangement with current. The use of coils for generating the magnetic field has the advantage that the magnetic field can be changed in a simpler way.

In particular, in the method, in particular according to the one of the second variant, where applicable combined with the first variant, the coil arrangement can be supplied with current such that the time-dependent magnetic field is generated. In the apparatus, the driving device can be configured to supply the coil arrangement with current in such a way that the time-dependent magnetic field is generated.

Further, in the method, the coil arrangement can be supplied with current pulses such that the coil arrangement is without current at least between two successive value documents. In the apparatus, the driving device can be configured for this purpose such that it supplies the coil arrangement with current pulses such that the coil arrangement is without current at least between two successive value documents. This has the advantage that the coil arrangement does not heat up so strongly.

During and/or preferably after influencing the optical property, which is influenceable by a magnetic field, of the security element by the magnetic field, the image of at least one portion of the value document, preferably of the total value document is captured. For this purpose, there is provided the image capturing device which has the capture region. The capture region within the framework of the present application is understood to mean that region which can be imaged by the image capturing device generating the image. For capturing the image, basically an arbitrary image sensor directed onto the capture region can be employed, which can capture in a locally resolved manner the optical property influenceable by the magnetic field. The local resolution transverse to the transport direction is preferably better than 1 mm. The image capturing device can employ as an image sensor for example a surface camera or a camera for recording a two-dimensional image, which camera has a two-dimensional, for example matrix-shaped, arrangement of photoelements. But preferably, the image capturing device can have a line camera arranged transversely to the transport direction, which during the transport of the value document through the capture region successively captures line images of the value document. The line camera can then form the image sensor. The image capturing device can assemble the line images in dependence on the transport speed into a two-dimensional image; the assembling can also be effected in the evaluation device, however.

The distance between the magnetic field-generating device and the capture region or the image capturing device is preferably so small that the optical property of the security element influenced by the magnetic field is maintained until the capture of the image.

The security element needs to be present only on one side of a value document. It is hence preferred that in the apparatus the image capturing device or at least one image sensor of the image capturing device is arranged on one side of the transport plane and a further image capturing device having a further capture region, which is configured to capture a locally resolved image of at least one portion of the value document having the security element while this is transported through the other capture region in a specified transport plane in a specified transport direction and to generate further image data describing the image, or at least one image sensor of the further image capturing device is arranged on an opposing side, relative to the transport plane, and the evaluation device is adapted to carry out the check for the image data and the further image data.

For checking the image data, the evaluation device of the apparatus of the invention can be employed. For this purpose, this can have at least one processor and a memory, in which there is stored a computer programme which is executable by the processor, as well as an interface for the image data. However, it is also possible to use only an FPGA, when the patterns generated by the magnetic field are not too complicated. Upon executing the programme, the processor then carries out the check of the image data.

According to the invention it is checked for example by the evaluation device of the apparatus whether the image data, which describe an image region showing the security element, have a location dependence transverse to the transport direction corresponding to the location dependence of the magnetic field and/or have a location dependence in the transport direction corresponding to the time dependence of the magnetic field.

This check can be effected in different ways. It is possible to search in the image described by the image data for a reference pattern corresponding to the properties of the magnetic field. The reference pattern can be respectively specified for a value document type in dependence on the employed magnetic field and have a location dependence corresponding to the location dependence of the magnetic field; it could have been obtained, for example, by examinations of value documents of the relevant value document type using the respective magnetic field. The reference pattern can be given, for example, by reference data which correspond to the image data in their kind. If the reference pattern is found, there can moreover be checked whether the reference pattern was found at a place of the value document or at a corresponding place of the image at which the security element should be. If this check is carried out for the reference patterns for various value document types, it is not necessary to previously determine the value document type.

It is preferred, however, that in the method upon the check there is first ascertained in the image a region for the security element and the further check of the location dependence is carried out only for the image data describing said region in the image. In the apparatus, for this purpose, the evaluation device can be configured to first ascertain, upon the check, a region for the security element in the image, and for the further check of the location dependencies, the image data describing said region in the image are employed. Upon the further check of the location dependence, for these image data there can in particular be checked whether they have a location dependence transverse to the transport direction corresponding to the location dependence of the magnetic field and/or a location dependence in the transport direction corresponding to the time dependence of the magnetic field. Preferably, only the image data for the region are employed. For this purpose, in the method, for the value document there can preferably previously be ascertained a value document from a quantity of specified value document types and/or the orientation of the value document. In the apparatus, for this purpose the evaluation device can preferably be configured to previously ascertain for the value document a value document from a quantity of specified value document types and/or the orientation of the value document. The region for the security element, i.e. the region in which the security element must be located in an authentic value document, can be specified by the value document type and the orientation. The orientations of a value document within the framework of the present invention are understood to mean, for rectangular value documents, in particular the four orientations of a value document which result from 90°-rotations around the longitudinal and transverse axis. This embodiment allows a much faster check.

In principle it is possible that the location-dependent optical properties of the security element are influenced by a transparent or translucent layer which only partly covers the security element or by a print with a transparent or translucent printing ink, which only partly covers the security element. Hence, upon the check as to whether the location dependence of the image data corresponds to the location dependence of the magnetic field there are taken into account optical properties, which are independent of a magnetic field, of a transparent or translucent layer arranged on the security element and only partly covering this, or a print with a transparent or translucent printing ink printed on the security element and only partly covering this. In the apparatus, for this purpose, the evaluation device can further be configured that upon the check as to whether the location dependence of the image data corresponds to the location dependence of the magnetic field there are taken into account optical properties, which are independent of a magnetic field, of a transparent or translucent layer arranged on the security element and only partly covering this, or a print with a transparent or translucent printing ink printed on the security element and only partly covering this. For example, after a region for the security element and an alignment of the value document has been ascertained, a transformation of the image data can be carried out, upon which influences arising by non-perfect alignment are compensated by the optical properties which are fixed relative to the value document and independent of the magnetic field.

The apparatus of the invention can preferably be employed in an apparatus for accepting and/or processing value documents. A subject matter of the invention is hence also an apparatus for accepting and/or processing value documents having a security element which has at least one optical property of the security element, which optical property is influenceable by a magnetic field, with a feeding device for feeding value documents, an output device for outputting processed value documents which has at least one pocket for a stack of processed value documents, a transport device for transporting singled value documents along a transport path from the feeding device to the output device, and an examination apparatus according to the invention arranged at the transport path. Preferably, the value document processing apparatus can further have a control device which is configured to control the transport device in dependence on signals of the examination apparatus.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

Figure 1:
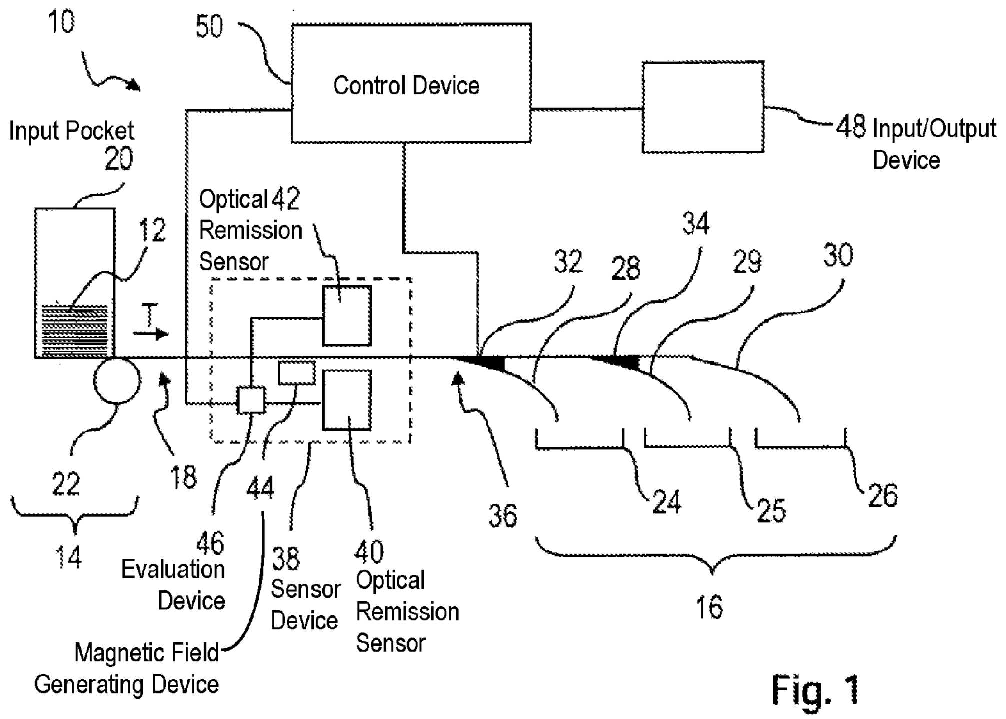
FIG. 1 a schematic view of a value document processing apparatus in the form of a bank-note sorting apparatus, FIG. 2 a schematic top view of a side of a value document in the form of a bank note having a security element whose optical properties are influenceable by a magnetic field, FIG. 3 a schematic sectional view of a part of the security element in FIG. 2 along a plane, marked by arrows, orthogonal to the surface of the value document, FIG. 4 a schematic top view of the value document having the security element which was exposed to a magnetic field in the form of stripes, FIG. 5 a schematic sectional view, corresponding to FIG. 3, of the part of the security element in FIG. 3 in a magnetic field which is inhomogeneous transversely to a longitudinal direction of the value document, FIG. 6 a view corresponding to FIG. 4, in which the value document is rotated relative to the magnetic field, FIG. 7 a schematic view of a part of an examination apparatus of the value document processing apparatus in FIG. 1, FIG. 8 a schematic perspective view of a magnetic field-generating device of the examination apparatus in FIG. 7, FIG. 9 a schematic view of the magnetic field-generating device in FIG. 8 in a section perpendicular to the transport direction with a very schematic representation of the course of the magnetic field, FIG. 10 a schematic view of an intensity distribution corresponding to the magnetic field in the FIGS. 7 to 9 in the capture region of the examination apparatus in FIG. 7, FIG. 11 a schematic perspective view of a magnetic field-generating device of a second embodiment of an examination apparatus, FIG. 12 a schematic perspective view of a magnetic field-generating device of a third embodiment of an examination apparatus, FIG. 13 a schematic perspective view of a portion of a magnetic field-generating device of a fourth embodiment of an examination apparatus, FIG. 14 a schematic top view of a value document having the security element with a pattern of the optical properties which is influenced by the magnetic field-generating device in FIG. 13, FIG. 15 a schematic plan view of a portion of a magnetic field-generating device of a fifth embodiment of an examination apparatus, FIG. 16 a schematic top view of a value document having the security element with a pattern of the optical properties which is influenced by the magnetic field-generating device in FIG. 15, FIG. 17 a view, corresponding to FIG. 9, of a magnetic field-generating device of a seventh embodiment for an examination apparatus, and FIG. 18 a schematic view of a further value document processing apparatus in the form of a bank note sorting apparatus with an eighth embodiment of an examination apparatus.

A value document processing apparatus 10 in FIG. 1 is configured for sorting value documents 12 having respectively one security element which has at least one optical property which is influenceable by a magnetic field. In particular, it is configured for sorting the value documents in dependence on the recognition of authenticity and state of processed value documents. The components of the apparatus described in the following are arranged in a housing (not shown) of the apparatus or are held at this, unless they are referred to as external.

The apparatus 10 has a feeding device 14 for feeding value documents, an output device 16 for receiving processed, i.e. sorted, value documents, and a transport device 18 for transporting singled value documents from the feeding device 14 to the output device 16.

The feeding device 14 comprises, in the example, an input pocket 20 for a value-document stack and a singler 22 for singling value documents out of the value-document stack in the input pocket 20 and for feeding the singled value documents to the transport device 18.

The output device 16 comprises, in the example, three output portions 24, 25 and 26 into which processed value documents can be sorted, sorted according to the result of the processing. In the example, each of the portions comprises a stack pocket and a stacking wheel (not shown) by means of which fed value documents can be deposited in the respective stack pocket.

The transport device 18 has, besides elements (not shown) such as a drive and transport elements, for example transport belts, at least two, in the example three, branches 28, 29 and 30 at whose ends one of the output portions 24, 25, 26 is respectively arranged, and, at the branching points, gates 32 and 34 controllable by actuating signals by means of which value documents are feedable to the branches 28 to 30 and thus to the output portions 24 to 26 in dependence on actuating signals.

On a transport path 36, defined by the transport device 18, between the feeding device 14, in the example more precisely the singler 22, and the first gate 32 after the feeding device 14, here the singler 22, in the transport direction there is arranged a sensor device 38 which measures physical properties of the value documents when value documents are being transported past, and forms sensor signals reproducing the measurement results. In this example the sensor device 38 has two sensors, namely two image capturing devices in the form of optical remission sensors 40 and 42, arranged on opposing sides of the transport path 36, which respectively capture a remission color image and a remission IR image of a respective side of the value document, and a magnetic field-generating device 44. The sensor signals formed by the sensors correspond to measuring data of the sensors, which depending on the sensor could already have been subjected to a correction, for example in dependence on calibrating data and/or noise properties. For the evaluation of the sensor signals of the sensors 42 and 44 there is provided an evaluation device 46 which evaluates the sensor data supplied by the sensors and generates and emits the signals representing the evaluation results.

For displaying operating data and for capturing operating data of a user, the value document processing apparatus 10 has an input/output device 48 which is realized in the example by a touch-sensitive display device ("touch screen").

A control device 50 has data interfaces, not shown in FIG. 1, by means of which it is connected via signal connections with the sensor device 38, the display device 48 and the transport device 18, in particular the gates 32 and 34.

The control device 50 displays operational data by means of the input/output device 48 and captures user inputs thereby, whereupon it controls the apparatus 10 accordingly.

The control device 50 is further configured, among other things, to evaluate the signals of the sensor device 38, to thereby ascertain an authenticity class and a state class for a respective value document, and to control the transport device 18 in dependence on the ascertained classes in such a way that the value documents are sorted and stacked in an output pocket corresponding to the classes.

For carrying out the mentioned functions, the control device 50 has a memory (not shown in the Figure), in which programme code is stored, and a processor. Upon execution of the programme code by the processor, the control device 50 executes the mentioned functions.

Figure 2:
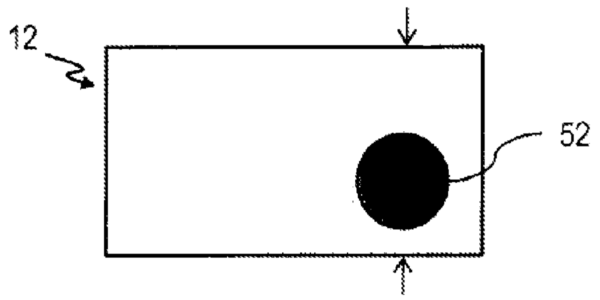
Figure 3:
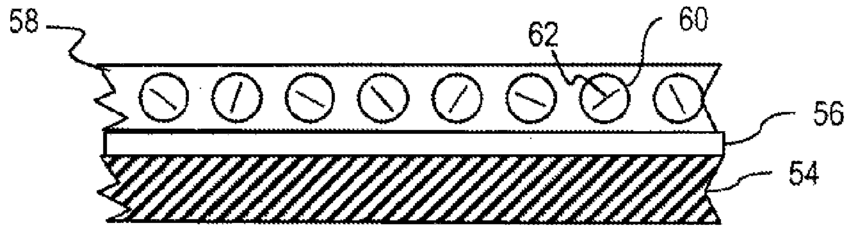

As schematically represented in FIGS. 2 and 3, the value document 12 of the embodiment has a security element 52 at a place on the value document specified for the value document type. The security element has an optical property which is influenceable by a magnetic field.

FIG. 3 schematically shows a sectional view through a portion of the value document 12 having the security element 52 along a plane perpendicular to the plane of the value document 12, indicated by the arrows in FIG. 2.

On a substrate 54, for example of bank note paper, there is located the security element 52. This has a background layer 56 arranged on the substrate, in the example an ink layer which in this embodiment is darkly coloured, and a layer 58 arranged thereon.

The layer 58 contains, in a transparent matrix, microcapsules 60 in which there are located movable platelet-shaped effect pigments 62. The effect pigments have on their areal side a, in this example, pale yellow color. Further, the effect pigments 62 are alignable by suitable magnetic fields, which is illustrated in the FIGS. 4 and 5.

Figure 5:
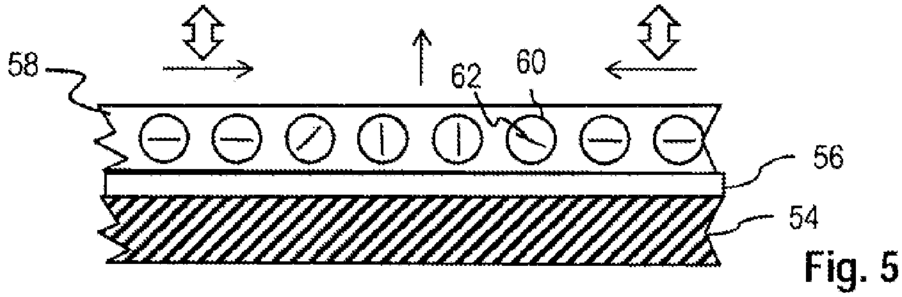

The direction of the magnetic field B is represented by arrows in FIG. 5. Its direction is respectively constant in the region of the security element 52 in FIG. 2, but in a direction transverse thereto it is inhomogeneous, so that it has the form of stripes. In regions in which the magnetic field extends in parallel or substantially in parallel to the plane of the value document and thus the layer 58, the reversibly alignable effect pigments 62 align themselves with their large surfaces in parallel to the magnetic field and thus the layer 58. Upon viewing from a direction perpendicular onto the plane of the value document 12, the pale yellow surfaces of the effect pigments are now visible, which is why the remission for optical radiation corresponding to the color pale yellow is relatively high. This is illustrated by block arrows in FIG. 5. In regions, however, in which the magnetic field B extends at least approximately perpendicular to the plane of the value document 12, the effect pigments 62 align themselves with their surfaces approximately perpendicular to the plane of the value document, so that upon viewing from a direction perpendicular onto the plane of the value document 12 only the very thin edges of the effect pigments are visible, so that substantially the dark ink layer 56 is visible.

Figure 4:
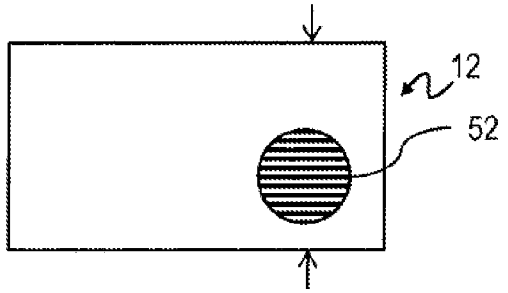

With a periodical sequence of regions having a magnetic field extending in parallel or perpendicular to the plane of the value document 12, there thus results the stripe pattern in the security element 52 shown in FIG. 4, the stripes extending in parallel to a direction which is perpendicular to the direction of the magnetic field.

Hence, the optical remission of the security element 52 is influenceable by the described magnetic field.

Figure 6:
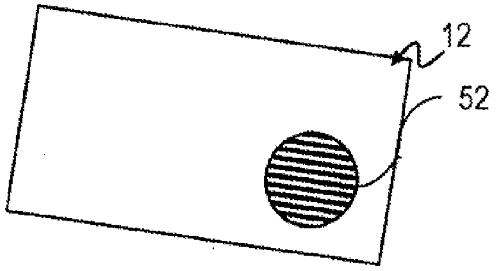

As the pattern is generated solely by the magnetic field in connection with the transport, it even keeps its direction, i.e. the direction of its stripes, with unchanged magnetic field, when the value document is rotated in the value document plane (cf. FIG. 6).

Concrete examples of such security elements are described, for example, in WO 2009/074284 A1 whose content is hereby incorporated in this description by reference.

For examining the optical properties of the value document and in particular also of the security element of the value document there serves the sensor device 38 which, among other things, forms an examination apparatus according to the invention for examining the value documents 12.

As an image capturing device it comprises the two remission sensors 40 and 42 which capture the optical remission properties of the value documents on the opposing sides of the value document. Furthermore, there is provided the magnetic field-generating device 44, regarded in transport direction T before the remission sensors 40 and 42. For the evaluation there serves the evaluation device 46 which is connected via signal connections with the image capturing devices 40 and 42 and which not only carries out the evaluation of the images of the remission sensors 40 and 42 with respect to the security element but in this embodiment also other evaluations of the remission image data.

Figure 7:
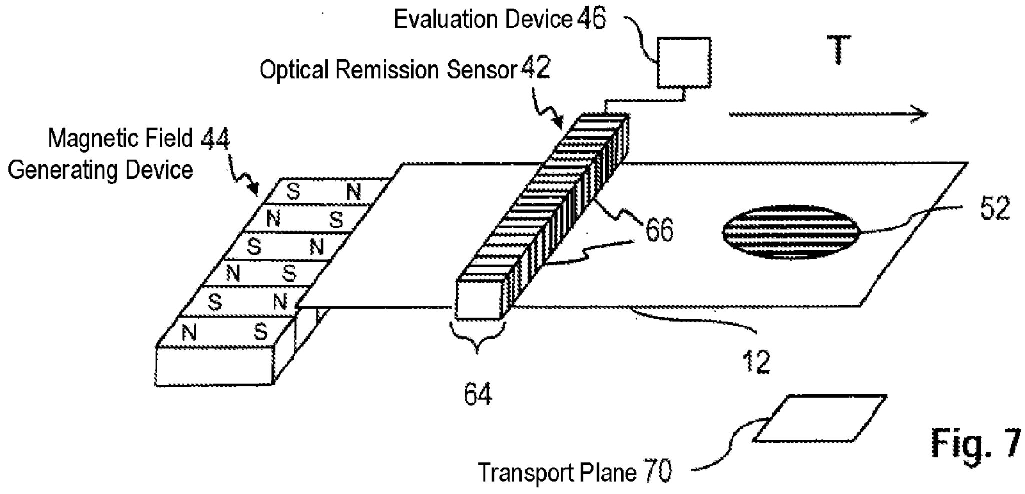

The image capturing devices 40 and 42 are equally configured, except for their arrangement at the transport path 36, so that it suffices to explain only the image capturing device 42. FIG. 7 shows very schematically a corresponding part of the examination device. This is a basically known remission sensor which has an illumination device (not shown in the Figures) for illuminating a capture region 64 and as an image sensor a line camera 64 with photoelements 66 arranged in the form of a line transversely to the transport direction as well as an optical system (not shown) for imaging the capture region 64 onto the line camera or the photoelements 66. In constant time intervals which are fixed in dependence on, among other things, the transport speed at which the value documents are transported or with a corresponding capturing rate the line camera captures an image of the capture region and generates a digital line image with pixels whose properties are described by pixel data. Successive line images are assembled into a digital image having pixels, which is described by image data given by the pixel data. The image has in particular a local resolution which is given by the resolution of the line camera 64 and the capturing rate for the line images, the location of a pixel relative to the examination device 38 or the sensor device 38 being given.

The evaluation device 46 comprises, besides interfaces for connection with the remission sensors 40 and 42 and the control device 50 (not shown in the Figures), a memory in which a computer programme is stored and a processor which can execute the computer programme. The computer programme contains, besides programme instructions, also configuration data which are employed upon the check and, where applicable, are stored in a separate file.

The magnetic field-generating device 44 generates a magnetic field inhomogeneous transversely to the transport direction T in such a way that in connection with the transport of the value document 12 and thus also of the security element 52 there is present a location dependence of the optical properties of the security element 52, a stripe pattern parallel to the transport direction T, through influencing by the magnetic field, when the security feature passes the capture region 64.

Figure 8:
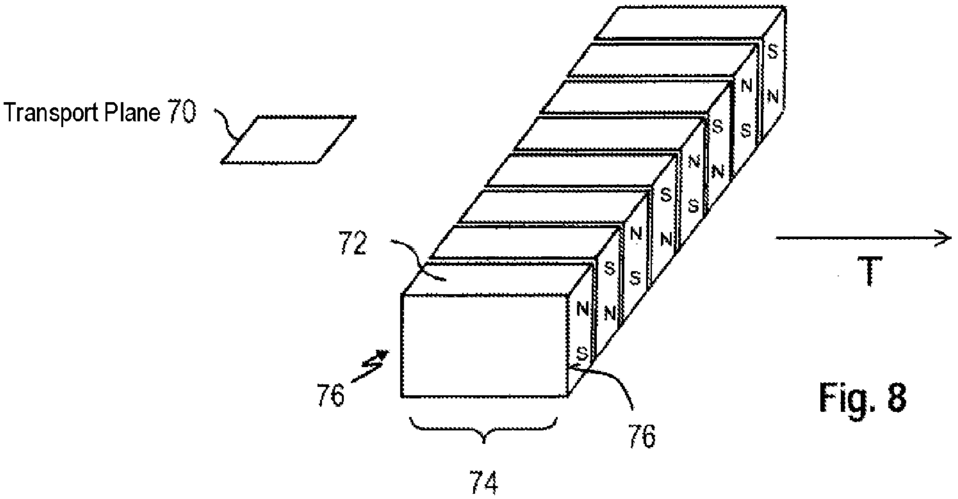
Figure 9:
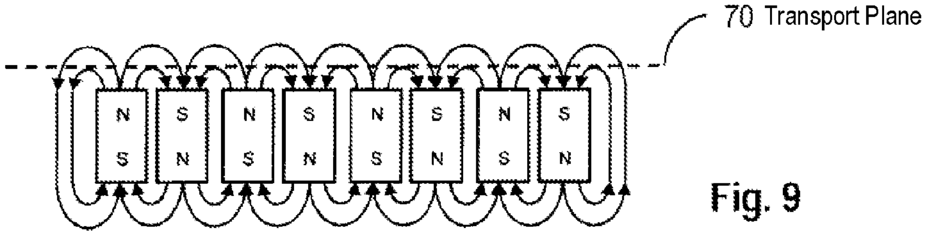

The magnetic field-generating device 44 is schematically represented in the FIGS. 8 and 9. In this embodiment there is exploited the fact that the change of the optical property of the security feature does not occur instantaneous. Rather, the effect pigments must be exposed to a magnetic field substantially constant at least in its direction over a period given by the security element, so that there is actually effected an alignment and a concomitant change of the optical property.

The magnetic field-generating device 44 comprises in the transport direction elongate, equally configured permanent magnets 68 which are arranged along a line transverse to the transport direction T. The permanent magnets 68 are here aligned with their dipoles perpendicular to the transport plane 70, the planar pole surfaces 72 most closely adjacent to the transport plane being parallel to the transport plane, i.e. their normals stand at least approximately orthogonal on the transport plane 70. More than 80% of the magnetic flux of the dipole exits through these pole surfaces. In addition, the permanent magnets 68 are arranged such that the directions of the dipoles of the permanent magnets alternate, i.e. directly adjacent permanent magnets have opposite polarity.

With respect to the resulting field course three regions, regarded in transport direction, can be differentiated: a main magnetization zone 74 which is delimited by the end faces 76 lying perpendicular to the transport direction T, and the end zones adjoining the main magnetization zone 74 on both sides in or against the transport direction T. In the main magnetization zone 74, the field direction along straight lines extending in parallel to the transport direction is substantially unchanged, so that on the security element there acts a magnetic field with substantially constant direction along straight lines in parallel to the transport direction over the length of the main magnetization zone 74. Transverse to the transport direction T, the field in the transport plane is inhomogeneous and has first regions over the pole surfaces, in which the magnetic field is orthogonal to the transport plane and thus to the security element. In second regions lying between the first regions the field is substantially parallel to the transport plane and thus to the security element and orthogonal to the transport direction. There thus results along the main magnetization zone a magnetic field inhomogeneous transversely to the transport direction, the inhomogeneity being substantially the same along the transport direction. The main magnetization zone is long such and the magnetic field is configured such that with the given transport speed influencing the optical properties of the security element, in the example the alignment of the effect pigments, is effected substantially in the main magnetization zone by the magnetic field.

In the main magnetization zone the magnetic field direction extends such that a projection of the magnetic field on the transport plane 70 in the region of the magnetic field forms with the transport direction T an angle between 85° and 90°, preferably an angle of 90°, unless the magnetic field extends orthogonal to the transport plane 70.

In the end zones the magnetic field extends in a different manner. On the one hand, it is weaker than the field in the main magnetization zone, however, and on the other hand, it extends in a strength appearing relevant over a substantially smaller distance in the transport direction. During the transport of the value document 12 along the transport direction T in the transport plane 70 the end regions hence have an only small influence, the optical property of the security element 52 is influenced substantially by the magnetic field in the main magnetization zone 74.

The distance between the magnetic field-generating device 44 and the image capturing devices 40 and 42 is selected such that the optical property of the security element influenced by the magnetic field is substantially unchanged when it enters the capture region 64.

Figure 10:
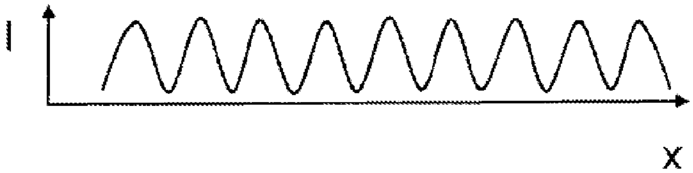

The security element's location-dependently varying optical property influenced by the magnetic field after it has left the end zone or when it enters the capture region 64 is shown in FIG. 10, which shows the course of the remitted intensity I along the line indicated by arrows in FIG. 2. Altogether, there results a stripe pattern parallel to the transport direction, which corresponds to the stripe pattern in FIG. 4. The stripe patterns in FIGS. 4, 6 and 7 are to be understood only qualitatively, the actual stripe densities are determined by the magnetic field-generating device 44.

The local resolution of the image capturing device 42 is better than the distance between most closely adjacent permanent magnets 62, so that the stripe pattern can be captured.

The digital image or the corresponding image data captured by the image capturing device 42 are now transferred to the evaluation device 46 which evaluates the image data and in particular checks whether the location dependence of the optical property, which is influenced by the magnetic field, transverse to the transport direction corresponds to that of the magnetic field, i.e. here to the location dependence transverse to the transport direction T in the main magnetization zone 74. I.e. it checks whether the image data which describe an image region showing the security element have a location dependence transverse to the transport direction corresponding to the location dependence of the inhomogeneous magnetic field transverse to the transport direction.

For this purpose, the evaluation device 46 first ascertains from the image data for the value document 12 the value document type thereof and the orientation thereof relative to the transport path.

On the basis of configuration data in the computer programme it then ascertains in dependence on the ascertained value document type and the ascertained orientation the position and form of the security element 52 at first relative to the value document 12. After determination of position and alignment of the value document 12 in the digital image, the evaluation device 46 then ascertains a region in the digital image, which corresponds to the security element 52, or corresponding image data describing the region of the image.

For comparing the location dependence, the evaluation device 46 employs only these image data, more precise the brightness in the visible wavelength range, which is ascertainable from the image data. Further, a reference pattern is employed which was obtained by transporting authentic value documents of the value document type having the security feature through the magnetic field and averaging the captured image data for the security feature over the employed value documents. The reference pattern is then given by reference data which correspond to the image data in the kind of the obtained information.

The evaluation device 46 ascertains for every location or corresponding image data the difference of the brightnesses of the image data and the reference data and forms the mean value of the squared differences. Then it compares the mean value with a specified threshold value. If the mean value exceeds the threshold value, it forms a signal which indicates that the location dependencies do not correspond to each and thus at least a forgery suspicion is present. Otherwise, it forms a signal which indicates that the location dependencies correspond to each other and thus no forgery suspicion is present for the security element.

A corresponding check is carried out for the image of the image capturing device 40.

Figure 11:
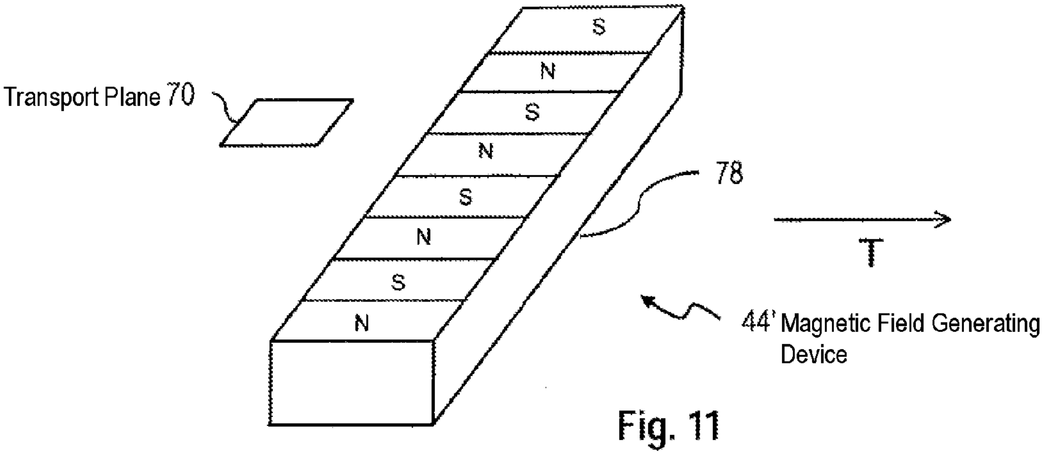

A second embodiment differs from the first embodiment only in the configuration of the magnetic field-generating device, which is replaced with a magnetic field-generating device 44' in FIG. 11, and the change of the computer programme in the evaluation device 46.

Instead of the permanent magnets 62 arranged in the form of a line there is now employed a magnetic foil 78 which has a Halbach arrangement of magnetic regions. The Halbach arrangement is configured such that above the foil there results a field course which resembles that of the first embodiment. Below the magnetic foil the magnetic field is very weak. The computer programme possesses accordingly changed data regarding the location dependence of the magnetic field or reference data.

Figure 12:
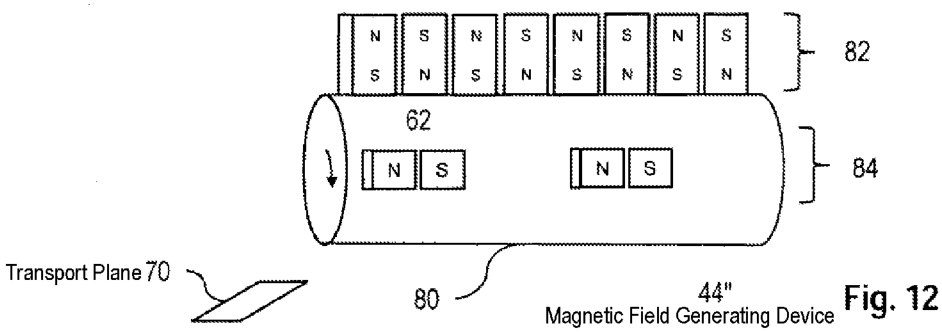

A third embodiment differs from the first embodiment only in the configuration of the magnetic field-generating device, which is replaced with a magnetic field-generating device 44" in FIG. 12, and the change of the computer programme in the evaluation device 46.

The magnetic field-generating device 44" has a retainer 80 in the form of a drum rotatable around an axis perpendicular to the transport direction, which retainer is movable back and forth between at least two positions, which drum has, held on its circumference, parallel to the axis or perpendicular to the transport direction T, a first arrangement 82 of permanent magnets 62 in the form of a line as in the first embodiment and a second arrangement 84 of permanent magnets 62 in the form of a line offset by 90° on the drum, which has only half of the permanent magnets 62, however.

In the first position the permanent magnets 62 of the arrangement 82 are aligned relative to the transport plane 70 as in the first embodiment. Hence, value documents can be checked as in the first embodiment.

In the second position of the retainer 80, in which the retainer 80 is rotated by 90° compared to the first position, the permanent magnets of the second arrangement 84 are located in an orientation relative to the transport plane 70 as in the first embodiment. Now there is generated a different magnetic field inhomogeneous transversely to the transport direction T, in the form of stripes parallel to the transport direction T, which leads to a different location dependence of the optical property of the security element 52 and thus to a different location dependence of the image data.

Before the examination of a value document a user can select the position of the retainer 80 and thus the magnetic field to be employed. Via a position sensor (not shown) the evaluation device can ascertain the position of the retainer and select the respective reference data upon the evaluation.

A fourth embodiment differs from the first embodiment only in the configuration of the magnetic field-generating device, which is replaced with a magnetic field-generating device 44$^{(3)}$, and the change of the computer programme in the evaluation device 46.

The magnetic field-generating device 44$^{(3)}$ generates the magnetic field electromagnetically.

Figure 13:
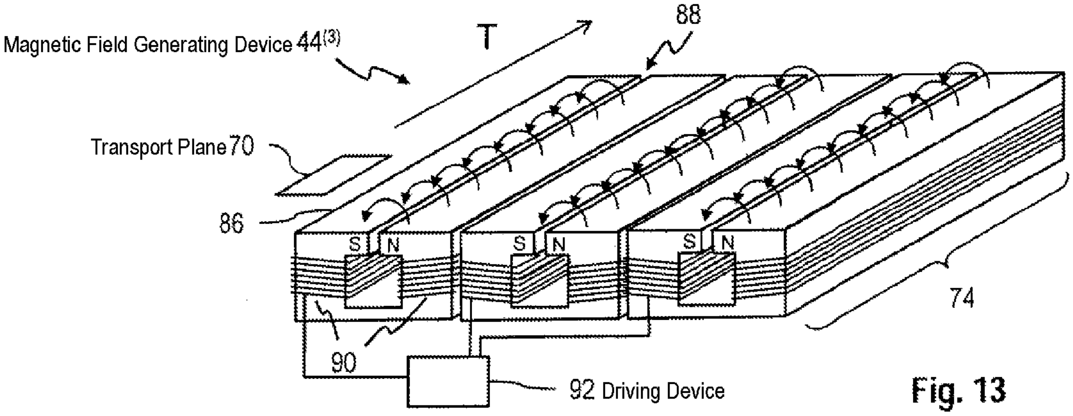

For this purpose it has a coil arrangement, only partially shown in FIG. 13, which has equally configured toroidal cores 86 respectively having a narrow gap 88 and coils or windings 90, and a driving device 92 which supplies the coil arrangement or the coils or windings with current, so that there arise the magnetic fields shown in FIG. 12 only very schematically for the main magnetization zone 74. The toroidal cores 86 and the respective gaps 88 extend with their longitudinal directions in parallel to the transport direction T. The toroidal cores 86 are manufactured of a magnetically soft material. The gap 88 is very narrow, which is why there arises a high magnetic field above the gap 88 whose projection on the transport plane 70, as in the preceding embodiments too, extends transversely to the transport direction. Again there is generated a magnetic field in the form of stripes between planes extending through the end faces of the toroidal cores 86 in the main magnetization zone, which is inhomogeneous transversely to the transport direction, and analogous to the first embodiment, leads to respective influencing the optical properties of the security element 52 and in particular in the capture region of the image capturing device 42 to a location dependence of the optical property and a corresponding location dependence of the image data, which extends transverse to the transport direction.

Figure 14:
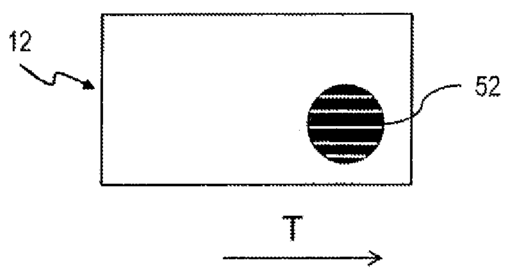

By the narrowness of the gap 88 there result substantially smaller regions with an alignment of the effect pigments which is parallel to the transport plane 70 and thus to the security element 52, which leads to narrow pale yellow or bright stripes against the dark background. This is illustrated in FIG. 14.

The evaluation device, more precise its programme, is then modified accordingly so that it can check whether the location dependence of the image data for the region having the security element in the direction transverse to the transport direction corresponds to the location dependence of the magnetic field transverse to the transport direction.

By the choice of the number of turns, the current strength, the dimensions and a suitable magnetic core material the arrangement can be used very efficiently and in a manner adapted to the needs. The longer e.g. the toroidal cores 86 are in the direction of T, the longer a value document guided thereabove is located in the magnetic field, which has the advantage that the effect pigments have more time to align themselves. Especially for quickly running machines this is an advantage, because thus also with these machines an alignment sufficient for the detection can be achieved.

A fifth embodiment differs from the fourth embodiment only in the configuration of the magnetic field-generating device, which is replaced with a magnetic field-generating device 44$^{(4)}$, and the change of the computer programme in the evaluation device 46.

Figure 15:
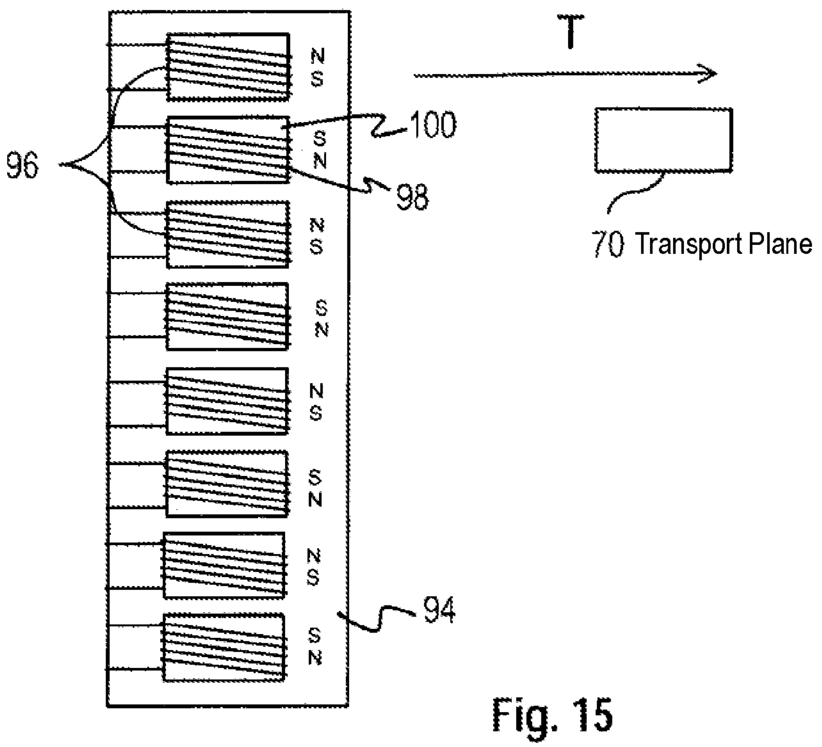

The magnetic field-generating device 44$^{(4)}$ has a coil arrangement which has equally configured electromagnets which are realized as SMD electromagnets or SMD inductances. FIG. 15 shows a carrier 94, for example a printed circuit board, with SMD electromagnets 96 arranged thereon in the form of a line transverse to the transport direction T. The SMD electromagnets are supplied with current—as in the preceding embodiment—by a driving device (not shown) of the magnetic field-generating device 44$^{(4)}$. The SMD electromagnets 96 have coils or windings 98, aligned transversely to the transport direction T and in parallel to the transport plane 70, in which there are ferrite cores 100.

The coils or windings are connected with the driving device such that upon energizing there result the dipoles shown in FIG. 14. There is again obtained a magnetic field inhomogeneous transversely to the transport direction T, which has regions with a field direction extending approximately orthogonal to the transport plane 70 (between the SMD electromagnets) alternating with regions with a field direction extending approximately in parallel to the transport plane 70 (above the SMD electromagnets). During the transport of the security element 52 through the magnetic field, this allows the optical property of the security element 52 to be influenced in the form of stripes by an alignment of the effect pigments of the security element, which entails a location dependence or location-dependent variation of the image data transverse to the transport direction.

The driving device is further configured such that, upon signals of a sensor monitoring the transport of the value documents, it supplies no current to the coils, when no value document is located in the region of the magnetic field-generating device. An unnecessary heating of the coils can be avoided thereby. This measure can also be taken in the preceding embodiment.

The computer programme of the evaluation device is adapted accordingly, analogous to the preceding embodiments.

The sixth embodiment differs from the fifth embodiment only in the configuration of the magnetic field-generating device, more precise the driving device, and the corresponding change of the computer programme in the evaluation device 46.

The driving device differs from the driving device of the fifth embodiment in the fact that it has a random generator. Before the arrival of a value document at the magnetic field-generating device a random number is ascertained. In dependence on the ascertained random number different ones of the coils are supplied with current, so that directly successive value documents are checked with different magnetic fields.

Further, data are transferred to the evaluation device, which describe which of the coils were supplied with current. The evaluation device then employs corresponding data for checking. This embodiment is transferable analogously to the fourth embodiment.

In this way, a view forgery can be recognized with high certainty, even when the number of coils employed in a value document processing apparatus or the examination apparatus is known.

A seventh embodiment differs from the fifth embodiment only in the configuration of the magnetic field-generating device, more precise the driving device, and the corresponding change of the computer programme in the evaluation device 46.

The driving device differs from the driving device of the fifth embodiment in that during the transport of the value document past the magnetic field-generating device it supplies the coils with current in time-dependent manner, so that single coils are switched off temporarily or are supplied with current in a pulsed manner. In this way, different portions of the value document are exposed to different magnetic fields, which leads in transport direction to a location dependence of the optical property influenceable by magnetic fields. In addition to a location-dependent variation of the optical property transverse to the transport direction there is obtained a location-dependent variation of the optical property in the transport direction.

The evaluation device or the computer programme is accordingly modified in order to check whether the location dependence of the image data and the location dependence and time dependence of the magnetic field correspond to each other.

Figure 16:
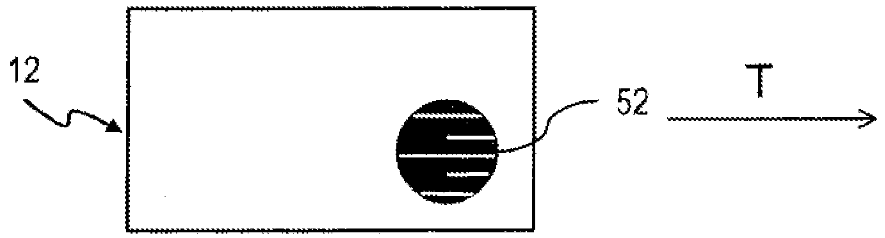

In FIG. 16 there is shown an example of a pattern of the optical property, which arises when every second one of the coils of the magnetic field-generating device is switched off after approximately half the time which the security element needs for passing the magnetic field.

The eighth embodiment differs from the first embodiment in that the magnetic field-generating device has magnets, electromagnets and/or permanent magnets on both sides of the transport plane 70.

Figure 17:
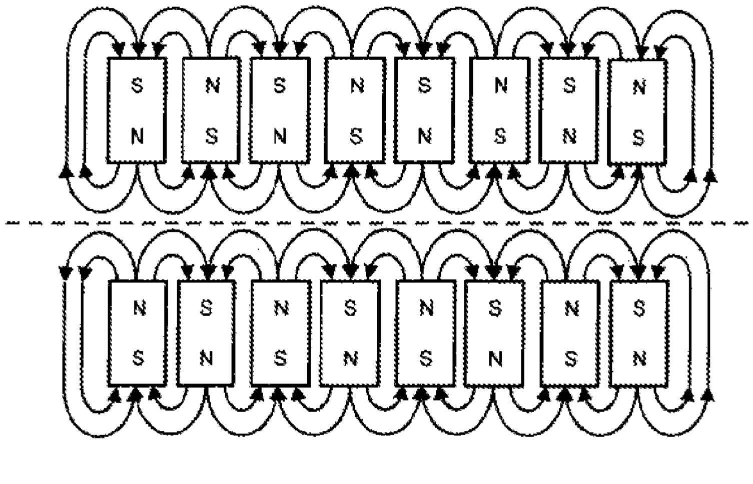

As shown in FIG. 17, an arrangement of permanent magnets with inverted direction of the dipoles, which corresponds to the arrangement of the permanent magnets 62 of the first embodiment, is arranged above the transport plane 70 in addition to the arrangement of the first embodiment. This results in an increased field strength in the regions with a magnetic field parallel to the transport plane 70. This leads to a stronger influencing of the optical property, in the example a quicker and better alignment of the effect pigments.

Further embodiments differ from the preceding embodiments in that in transport direction before the magnetic field-generating device there is arranged a magnetic deleting device which substantially removes a location dependence of the optical property of the security element.

Figure 18:
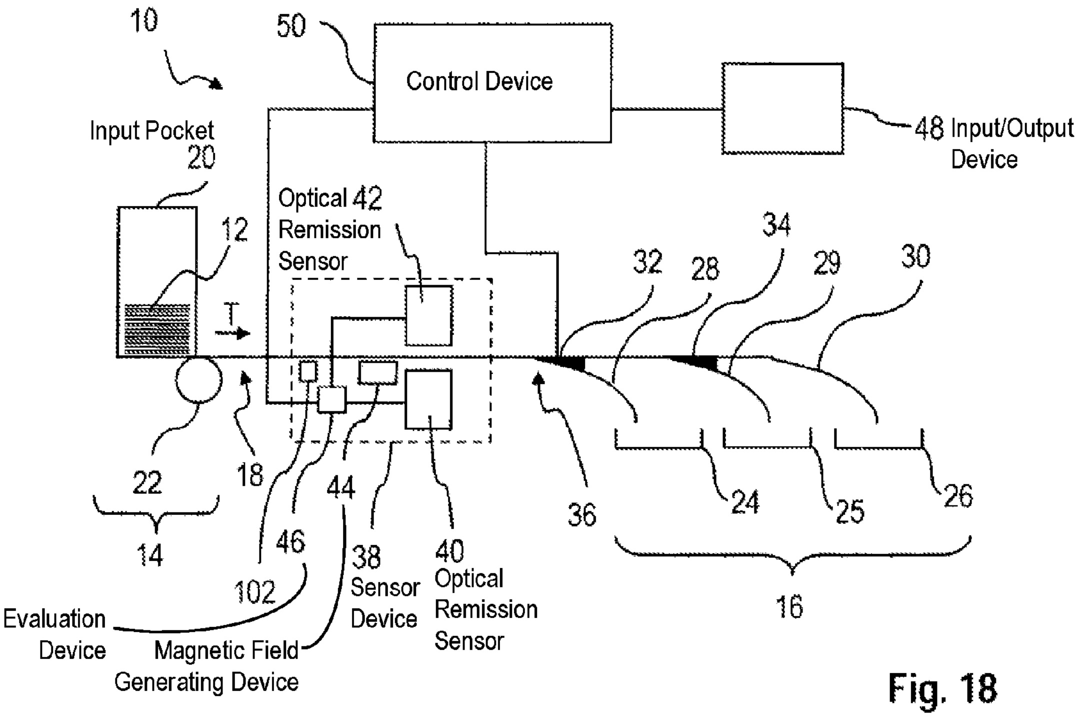

An example of this is shown in FIG. 18, which has an electromagnet as a deleting device 102, which is formed, as in the fourth embodiment, by a toroidal core with gap and coil winding, but is aligned with its longitudinal direction transverse to the transport direction T. The deleting device 102, in this example the electromagnet, generates a magnetic field substantially homogeneous transversely to the transport direction in such a way that the optical property of the security element has an only very low, preferably no location dependence resolvable for the image capturing device.

Suitable permanent magnets can also be employed, however.

Other embodiments differ from the embodiments described hereinabove in that the image data, upon checking, are first filtered in such a way that image regions which have a color lying beyond a specified color range are replaced by a specified background color or white or black. The evaluation device is then configured accordingly. In particular, the color range can be so specified that the optical property of the security element, which is influenceable by a magnetic field, after influencing by a magnetic field having a specified direction lies within the range, but in the case of a magnetic field orthogonal to the specified direction outside. In the example, the color range may contain, for example, the color of the surface of the effect pigments, but not pure green, red or blue. This embodiment has the advantage that also in the case of a color-structured background or ink layer of the security elements described within the framework of the first embodiment an easy and secure check of the location dependencies is possible.

Further embodiments may differ from the embodiments having a static magnetic field inhomogeneous transversely to the transport direction, which were described hereinabove, in that the evaluation device is configured such that upon the check as to whether the image data which describe an image region showing the security element have a location dependence transverse to the transport direction corresponding to the location dependence of the magnetic field, it is only checked whether the brightnesses or intensities given by the image data have maxima and minima at specified places which are determined by the direction of the magnetic field.

Alternatively or additionally, the evaluation device can be configured such that upon the check as to whether the image data, which describe an image region showing the security element, have a location dependence transverse to the transport direction corresponding to the location dependence of the magnetic field, it is checked whether mean values of the image data corresponding to the region having the security element have along the transport direction a location dependence which then exits transverse to the transport direction which corresponds to the location dependence of the magnetic field. For checking whether the location dependencies correspond to each other, there can be ascertained for example a mean value over the amount of the deviations between the brightnesses resulting from the mean value and reference data and be compared with a threshold value. When the threshold value is exceeded, it is recognized that the location dependencies do not correspond to each other. The reference data can be ascertained analogously to the first embodiment in that for authentic value documents image data are captured for the region of the security element under the same transport conditions and mean values are formed in the direction of the transport direction. Over these mean values there is formed a mean value for all value documents. From this can then be ascertained, depending on the location transverse to the transport direction, the brightness as reference data. This alternative allows a particularly quick check.

Yet a further embodiment differs from the embodiments hereinabove in that the magnetic field-generating device is formed by a magnetic field-generating device of a magnetic sensor, for example for examining security threads having typical magnetic properties.

Other embodiments differ from the embodiments described hereinabove in that the value document processing apparatus is configured to verify the quality of the value documents and in particular of the security element after the manufacture, but before the circulation. For this purpose, the sorting criteria are adjusted accordingly.

Yet further embodiments differ from the embodiments described hereinabove in that the security element has a transparent or translucent foil on which there is configured the layer with the microspheres having the effect pigments alignable by a magnetic field. The security element covers a hole in the value document. The examination apparatus now has, instead of the two image capturing devices 40 and 42, a transmission sensor, which captures respective images, as an image capturing device. The evaluation device is accordingly configured for evaluating the images of the image capturing device.

A further subject matter of the present invention is an apparatus for examining a security element of a value document, wherein at least one optical property of the security element is influenceable by a magnetic field, with two image capturing devices spaced along a transport path for the value document, which respectively have a capture region, which are respectively configured to capture a locally resolved image of at least one portion of the value document having the security element, while this is transported through their capture region in a specified transport plane in a specified transport direction, and to generate image data describing the image, a magnetic field-generating device for generating a magnetic field, regarded in transport direction between the capture regions, so that the security element has optical properties influenced by the magnetic field when it passes the capture region of the image capturing device located in transport direction after the magnetic field, and an evaluation device for evaluating the image data of the image capturing devices, which is configured to check whether the image data of the image capturing devices, which describe an image region showing the security element, match.

A further subject matter is a method for examining a security element of a value document, wherein at least one optical property of the security element is influenceable by a magnetic field, in which a first image of at least one portion of the value document having the security element is captured and image data describing the image are formed, thereafter the value document is transported through a magnetic field, a second image of at least one portion of the value document having the security element is captured and image data describing the image are formed, wherein the optical properties of the security element are being influenced by the magnetic field, and it is checked whether die image data of the first and of the second image, which respectively describe an image region showing the security element, match.

Preferably, the magnetic field is inhomogeneous and/or time variable transversely to the transport direction. The evaluation device is then preferably configured to further check whether the image data, which describe an image region showing the security element, of the image capturing device whose capture region the value document passes last, have a location dependence transverse to the transport direction corresponding to the location dependence of the magnetic field and/or a location dependence in the transport direction corresponding to the time dependence of the magnetic field. In the method it is preferably checked whether the image data of the second image have a location dependence transverse to the transport direction corresponding to the location dependence of the magnetic field and/or have a location dependence in the transport direction corresponding to the time dependence of the magnetic field.

The invention claimed is:

1. An apparatus for examining a security element of a value document, wherein at least one optical property of the security element is changeable by a magnetic field, comprising:

an image capturing device having a capture region, which is configured to capture a locally resolved image of at least one portion of the value document having the security element, while this is transported through the capture region in a specified transport plane in a specified transport direction, and to generate image data describing the image, a magnetic field-generating device for generating before or in the capture region a magnetic field which is inhomogeneous transversely to the transport direction or variable in time, so that the security element has optical properties which are or have been changed by the magnetic field when it passes the capture region; and an evaluation device for evaluating the image data, which is configured to check whether those image data, which describe an image region showing the security element, have a location dependence in a direction transverse to the transport direction which corresponds to the location dependence of the magnetic field in a direction transverse to the transport direction or have a location dependence in the transport direction which corresponds to the time dependence of the magnetic field.

2. The apparatus according to claim 1, in which the magnetic field-generating device is configured such that in the transport plane the direction of the magnetic field in at least some first portions encloses with the transport plane an angle of less than 40°, and in other second portions encloses with the transport plane an angle between 50° and 90°, wherein the first and second portions are alternately arranged transverse to the transport direction.

3. The apparatus according to claim 2, in which the magnetic field-generating device has at least one permanent magnet or a permanent magnet foil.

4. The apparatus according to claim 3, in which the magnetic field-generating device has a retainer movable back and forth between a specified number of positions relative to the optical detection device, in which retainer, permanent magnets are arranged such that in each of the positions at least one of the permanent magnets generates a different magnetic field inhomogeneous at least in the transport plane and transverse to the transport direction.

5. The apparatus according to claim 4, in which the magnetic field-generating device has a coil arrangement with at least one coil for generating a magnetic field and has a driving device which supplies the coil arrangement with current.

6. The apparatus according to claim 5, in which the driving device is configured such that it supplies the coil arrangement with current pulses such that the coil arrangement is without current at least between two successive value documents.

7. The apparatus according to claim 5, in which the driving device is configured to supply the coil arrangement with current in such a way that the time-dependent magnetic field is generated.

8. The apparatus according to claim 7, in which the evaluation device is configured to first ascertain, upon the check, a region for the security element in the image and for the further check of the location dependence the image data describing said region in the image are employed.

9. A method for examining a security element of a value document, wherein at least one optical property of the security element is changeable by a magnetic field, comprising the steps transporting the value document through a magnetic field which is inhomogeneous transversely to the transport direction or is varied in time whereby the optical properties of the security element are changed by the magnetic field, capturing an image of at least one portion of the value document comprising the security element and forming image data describing the image and checking whether those image data, which describe an image region showing the security element, have a location dependence transverse to the transport direction which corresponds to the location dependence of the magnetic field or have a location dependence in the transport direction which corresponds to the time dependence of the magnetic field.

10. The method according to claim 9, in which in at least some first portions the direction of the magnetic field in the transport plane encloses with the transport plane an angle of less than 40°, and in other second portions encloses with the transport plane an angle between 50° and 90°, wherein the first and second portions are alternately arranged transverse to the transport direction.

11. The method according to claim 9, in which the magnetic field is generated using at least one permanent magnet or one permanent magnet foil.

12. The method according to claim 9, in which before the transporting of the value document, a retainer movable back and forth between a specified number of positions, in which retainer, permanent magnets are arranged such that in each of the positions at least one of the permanent magnets generates a different magnetic field inhomogeneous at least in the transport plane and transverse to the transport direction, can be moved from an existing position into a new position.

13. The method according to claim 9, in which the magnetic field is generated using a coil arrangement with at least one coil for generating a magnetic field.

14. The method according to claim 13, in which the coil arrangement is supplied with current pulses such that the coil arrangement is without current at least between two successive value documents.

15. The method according to claim 13, in which the coil arrangement is supplied with current such that the time-dependent magnetic field is generated.

16. The method according to claim 9, in which upon the check there is first ascertained a region for the security element in the image and the further check of the location dependence is carried out for the image data describing said region in the image.

* * * * *